(12) United States Patent
Joseph

(10) Patent No.: US 12,229,198 B2
(45) Date of Patent: Feb. 18, 2025

(54) SYSTEM, METHOD, AND COMPUTER PROGRAM PRODUCT FOR AUTOMATICALLY PREPARING DOCUMENTS FOR A MULTI-NATIONAL ORGANIZATION

(71) Applicant: Orbitax LLC, Palo Alto, CA (US)

(72) Inventor: Gratian Joseph, Pacifica, CA (US)

(73) Assignee: Orbitax LLC, Palo Alto, CA (US)

( * ) Notice: Subject to any disclaimer, the term of this patent is extended or adjusted under 35 U.S.C. 154(b) by 57 days.

(21) Appl. No.: 18/211,833

(22) Filed: Jun. 20, 2023

(65) Prior Publication Data

US 2023/0334101 A1 Oct. 19, 2023

Related U.S. Application Data

(63) Continuation of application No. 17/919,852, filed as application No. PCT/US2022/020314 on Mar. 15, 2022, now Pat. No. 11,727,067.

(60) Provisional application No. 63/161,636, filed on Mar. 16, 2021.

(51) Int. Cl.
   *G06F 16/93* (2019.01)
   *G06Q 10/06* (2023.01)
   *G06Q 40/12* (2023.01)

(52) U.S. Cl.
   CPC .............. *G06F 16/93* (2019.01); *G06Q 10/06* (2013.01); *G06Q 40/123* (2013.12)

(58) Field of Classification Search
   CPC ....... G06Q 40/123; G06Q 10/06; G06F 16/93
   See application file for complete search history.

(56) References Cited

U.S. PATENT DOCUMENTS

| | | | | |
|---|---|---|---|---|
| 6,804,657 | B1* | 10/2004 | Sultan ................ | G06Q 30/0202 705/7.31 |
| 6,859,823 | B1* | 2/2005 | Nishihara ............. | G06Q 10/10 709/224 |
| 2003/0014273 | A1 | 1/2003 | Seki et al. | |
| 2006/0259340 | A1* | 11/2006 | Doherty ............. | G06Q 10/0639 705/7.29 |
| 2010/0312697 | A1 | 12/2010 | Fracchia et al. | |
| 2014/0317049 | A1* | 10/2014 | DeRoller ............. | G06Q 10/103 707/608 |
| 2015/0163206 | A1 | 6/2015 | McCarthy et al. | |
| 2019/0222560 | A1 | 7/2019 | Ford et al. | |

(Continued)

*Primary Examiner* — Hau H Hoang
(74) *Attorney, Agent, or Firm* — The Webb Law Firm

(57) ABSTRACT

Provided is a system, method, and apparatus for automatically preparing documents for a multi-national organization. The method includes generating a document preparation workflow based on multi-national organization data for the multi-national organization, the document preparation workflow including a sequence of nodes based on multi-national organization data and rules data, the multi-national organization data including at least one multi-national organization chart and transactions associated with the multi-national organization, configuring at least one node of the sequence of nodes by identifying at least one role associated with the at least one node of a plurality of roles, and executing the document preparation workflow by automatically performing a plurality of actions associated with the sequence of nodes based on the multi-national organization data and the rules data.

21 Claims, 10 Drawing Sheets

(56) References Cited

U.S. PATENT DOCUMENTS

2020/0202301 A1  6/2020  Chen
2020/0401983 A1  12/2020  Meyerzon et al.

* cited by examiner

SYSTEM, METHOD, AND COMPUTER PROGRAM PRODUCT FOR AUTOMATICALLY PREPARING DOCUMENTS FOR A MULTI-NATIONAL ORGANIZATION

CROSS REFERENCE TO RELATED APPLICATIONS

This application is a continuation of U.S. application Ser. No. 17/919,852, filed Mar. 15, 2022, which is the United States national phase of International Application No. PCT/US2022/020314 filed Mar. 15, 2022, which claims priority to U.S. Provisional Patent Application No. 63/161,636, filed Mar. 16, 2021, the disclosures of which are incorporated herein by reference in their entirety.

BACKGROUND

1. Field

This disclosure relates generally to workflows for multi-national entities and, in non-limiting embodiments, to systems, methods, and computer program products for automatically preparing documents and/or automatically manipulating and executing a workflow for the preparation of documents.

2. Technical Considerations

Multi-national entities (MNEs) (e.g., multi-national organizations) need to comply with multiple national tax laws. The changes in international tax rules make it complex for companies having multiple entities in different countries to track the changes in tax laws, understand which ones have an impact, and coordinate with multiple stakeholders internally to perform appropriate actions.

Given the expansiveness and complexity of regulatory requirements for multi-national organizations, existing systems are unable to coordinate contributions from multiple sources and individuals to ensure data entry of timely, complete, and accurate information.

SUMMARY

According to non-limiting embodiments or aspects, provided is a computer-implemented method for automatic document preparation for a multi-national organization having at least two legal entities, comprising: generating, with at least one processor, a document preparation workflow based on multi-national organization data for the multi-national organization, the document preparation workflow comprising a sequence of nodes based on multi-national organization data and rules data, the multi-national organization data comprising at least one multi-national organization chart and transactions associated with the multi-national organization; configuring, with the at least one processor, at least one node of the sequence of nodes by identifying at least one role associated with the at least one node of a plurality of roles; executing, with the at least one processor, the document preparation workflow by automatically performing a plurality of actions associated with the sequence of nodes based on the multi-national organization data and the rules data; determining, with the at least one processor, that user input is needed to perform at least one action associated with the at least one node based on the multi-national organization data and the rules data; in response to determining that user input is needed, determining, with the at least one processor, at least one user corresponding to the at least one role; automatically communicating, with the at least one processor, at least one query for the user input to the at least one user; and processing, with the at least one processor, the at least one action associated with the at least one node based on receiving at least one response to the at least one query.

In non-limiting embodiments or aspects, configuring the at least one node comprises linking, in a data structure based on input from a user, at least one user identifier with each role of a plurality of roles. In non-limiting embodiments or aspects, automatically communicating the at least one query comprises: identifying a contact method corresponding to the at least one user; and communicating a message to the at least one user based on the contact method, the message comprising a selectable option configured to display, when selected by the at least one user, at least one GUI configured to receive the at least one response to the at least one query. In non-limiting embodiments or aspects, the at least one action comprises at least one of data validation and data retrieval, and the user input comprises at least one of a validation response and a data input response. In non-limiting embodiments or aspects, the at least one user comprises a first user and a second user, and wherein a role of the first user corresponds to the data validation and a role of the second user corresponds to the data input response. In non-limiting embodiments or aspects, configuring the at least one node comprises linking, in a data structure based on input from a user, at least one due date with at least one action. In non-limiting embodiments or aspects, the document preparation workflow is executed at least partially based on the at least one due date. In non-limiting embodiments or aspects, the method includes: scheduling repeated execution of the document preparation workflow; determining, prior to a subsequent execution of the document preparation workflow, a change in at least one of the multi-national organization data and the rules data; in response to determining the change, automatically altering the document preparation workflow based on the change; and continuing repeated execution of the document preparation workflow. In non-limiting embodiments or aspects, each role of the plurality of roles is associated with at least one of the following: a data element, a data type, a geographic region, or any combination thereof. In non-limiting embodiments or aspects, the multi-national organization data comprises a multi-national organization footprint based on the at least one multi-national organization chart and the transactions. In non-limiting embodiments or aspects, configuring the at least one node comprises identifying, with at least one filter, at least one question based on at least one of the following: a role, a geographic region, or any combination thereof. In non-limiting embodiments or aspects, the method includes generating a question bank based on a plurality of questions identified with the at least one filter.

According to non-limiting embodiments or aspects, provided is a system for automatic document preparation for a multi-national organization having at least two legal entities, comprising at least one processor programmed or configured to: generate a document preparation workflow based on multi-national organization data for the multi-national organization, the document preparation workflow comprising a sequence of nodes based on multi-national organization data and rules data, the multi-national organization data comprising at least one multi-national organization chart and transactions associated with the multi-national organization; configure at least one node of the sequence of nodes by identifying at least one role associated with the at least one node of a plurality of roles; execute the document preparation workflow by automatically performing a plurality of actions associated with the sequence of nodes based on the multi-national organization data and the rules data; determine that user input is needed to perform at least one action associated with the at least one node based on the multi-national organization data and the rules data; in response to determining that user input is needed, determine at least one user corresponding to the at least one role; automatically communicate at least one query for the user input to the at least one user; and process the at least one action associated with the at least one node based on receiving at least one response to the at least one query.

In non-limiting embodiments or aspects, configuring the at least one node comprises linking, in a data structure based on input from a user, at least one user identifier with each role of a plurality of roles. In non-limiting embodiments or aspects, automatically communicating the at least one query comprises: identifying a contact method corresponding to the at least one user; and communicating a message to the at least one user based on the contact method, the message comprising a selectable option configured to display, when selected by the at least one user, at least one graphical user interface configured to receive the at least one response to the at least one query. In non-limiting embodiments or aspects, the at least one action comprises at least one of data validation and data retrieval, and the user input comprises at least one of a validation response and a data input response. In non-limiting embodiments or aspects, the at least one user comprises a first user and a second user, and a role of the first user corresponds to the data validation and a role of the second user corresponds to the data input response. In non-limiting embodiments or aspects, configuring the at least one node comprises linking, in a data structure based on input from a user, at least one due date with at least one action. In non-limiting embodiments or aspects, the document preparation workflow is executed at least partially based on the at least one due date. In non-limiting embodiments or aspects, the processor is further configured to: schedule repeated execution of the document preparation workflow; determine, prior to a subsequent execution of the document preparation workflow, a change in at least one of the multi-national organization data and the rules data; in response to determining the change, automatically alter the document preparation workflow based on the change; and continue repeated execution of the document preparation workflow. In non-limiting embodiments or aspects, each role of the plurality of roles is associated with at least one of the following: a data element, a data type, a geographic region, or any combination thereof. In non-limiting embodiments or aspects, the multi-national organization data comprises a multi-national organization footprint based on the at least one multi-national organization chart and the transactions. In non-limiting embodiments or aspects, configuring the at least one node comprises identifying, with at least one filter, at least one question based on at least one of the following: a role, a geographic region, or any combination thereof. In non-limiting embodiments or aspects, the method further comprises generating a question bank based on a plurality of questions identified with the at least one filter.

According to non-limiting embodiments or aspects, provided is a computer program product for automatic document preparation for a multi-national organization having at least two legal entities, comprising at least one non-transitory computer-readable medium including program instructions that, when executed by a processor of at least one computing device, cause the processor to: generate a document preparation workflow based on multi-national organization data for the multi-national organization, the document preparation workflow comprising a sequence of nodes based on multi-national organization data and rules data, the multi-national organization data comprising at least one multi-national organization chart and transactions associated with the multi-national organization; configure at least one node of the sequence of nodes by identifying at least one role associated with the at least one node of a plurality of roles; execute the document preparation workflow by automatically performing a plurality of actions associated with the sequence of nodes based on the multi-national organization data and the rules data; determine that user input is needed to perform at least one action associated with the at least one node based on the multi-national organization data and the rules data; in response to determining that user input is needed, determine at least one user corresponding to the at least one role; automatically communicate at least one query for the user input to the at least one user; and process the at least one action associated with the at least one node based on receiving at least one response to the at least one query.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

Figure 1:
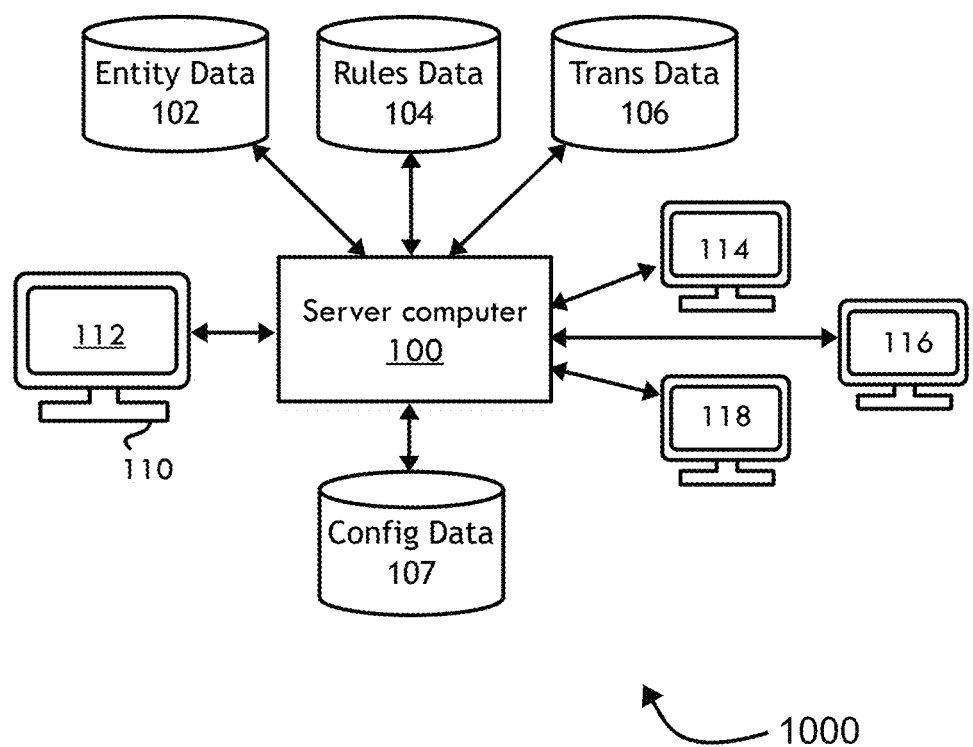
FIG. 1 illustrates a system for automatically preparing documents and/or automatically manipulating and executing a workflow for the preparation of documents according to a non-limiting embodiment.

It is to be understood that the embodiments may assume various alternative variations and step sequences, except where expressly specified to the contrary. It is also to be understood that the specific devices and processes described in the following specification, are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer.

As used herein, the terms "multi-national organization data" or "entity data" may refer to parameters relating to a multi-national organization, such as corporate structure, subsidiary information, country-specific information, shareholder information, historical tax information, financial information, and/or the like. Multi-national organization data may include entity names, entity countries, entity ownership, list of directors, date of creation, date of dissolution, sale, and/or disposition, and/or the like.

As used herein, the term "transaction data" may refer to parameters relating to transactions conducted by a multi-national organization, such as accounts receivable, accounts payable, dividend information, items or services at-issue in a transaction, dates and times for transactions, and/or the like.

As used herein, the terms "tax rules data" or "rules data" may refer to parameters relating to tax rules, including tax laws, tax regulations, tax guidance, and/or the like. Tax rules data may include both multi-national organization-specific information, such as configured rules used by the multi-national organization, in addition to information that is not specific to a multi-national organization, such as public tax laws and databases.

As used herein, the term "node" may refer to a visual representation of one or more actions. Such actions may be performed automatically by one or more computing devices and/or may be performed manually by a user. For example, a node may be a represented by a graphical element that can be arranged on a display screen.

As used herein, the term "workflow" may refer to an arrangement of one or more nodes in one or more sequences. For example, a workflow may include a plurality of nodes connected in a sequence. A workflow may be linear or in other examples may include branching logic with different paths of nodes. A workflow may be executable, such that the actions represented by the nodes in the workflow are performed in sequence automatically or partially automatically by a computing device. As an example, a workflow may include a sequence of actions that are either automated and/or performed by a user in response to a prompt (e.g., instruction or other form of guidance).

As used herein, the term "workflow data" may refer to data representing an overall structure of a workflow, such as a sequence of nodes, and may include predefined templates, predefined complete workflows, and/or the like.

As used herein, the term "configuration data" may refer to parameters used to define one or more aspects of a workflow or a node thereof, such as a sequence of nodes, actions for nodes, roles for nodes, and/or the like. Configuration data may be part of or separate from workflow data.

Non-limiting embodiments provide for a system, method, and computer program product for automatically preparing documents and/or manipulating and executing a workflow for the preparation of documents. Through the use of workflows organized as sequences of nodes, linked roles, and customized nodes, non-limiting embodiments described herein improve upon the use of computing resources, including the numbers of communications that are made and processed, as compared to other document preparation methods which involves duplication, misdirected queries, and/or the like. Further, a unique arrangement of systems and databases is described herein for providing for an efficient flow and collection of data through organized and targeted queries based on an initial workflow configuration.

FIG. 1 shows a system 1000 for automatically preparing documents and/or manipulating and executing a workflow for a multi-national organization according to non-limiting embodiments. The system 1000 includes a server computer 100, which may be a computing device operating in a network environment. The server computer 100 may be in communication with one or more data storage devices 102, 104, 106, 107 through local and/or remote communication paths. In the example shown, the server computer 100 is in communication with a multi-national organization database including multi-national organization data (e.g., entity data) stored on a first data storage device (entity database) 102, a tax rules database including a plurality of rules stored on a second data storage device (rules database) 104, a transaction database including transaction data stored on a third data storage device (transaction database) 106, and a configuration database including configuration data stored on a fourth data storage device (configuration database) 107. It will be appreciated that various arrangements of data storage devices and data structures may be used, and that the data may be stored on one or more data storage devices that are local or remote to the server computer 100. It will also be appreciated that, in some examples, the data may be stored by a service which provides the data via an Application Programming Interface (API) from hosted arrays of storage devices.

In non-limiting embodiments, a multi-national organization footprint is generated based on a multi-national organization chart (e.g., multi-national organization data representative of corporate structure, subsidiary information, and/or the like), which may be obtained from the entity database 102, and transaction data, which may be obtained from the transaction database 106. As used herein, the term "footprint" may refer to a unique profile for one or more entities that include values for a plurality of parameters including, but not limited to, jurisdictions and/or regions of operation, employee statistics, financial statistics, and/or the like. For example, an entity footprint may include transaction data and organization data for an entity.

The multi-national organization footprint and tax rules data (e.g., obtained from the rules database 104) are used to generate a document preparation workflow having one or more stages, each stage associated with one or more nodes. In non-limiting embodiments, the document preparation workflow includes a sequence of nodes where each node is associated with an action, such as but not limited to data retrieval, data validation, data input, data manipulation, data processing, report generation, notification generation, and/or the like. The actions (e.g., steps) represented by nodes may be related to preparing and/or filing one or more documents.

With continued reference to FIG. 1, the server computer 100 is in communication with a client computing device 110. The client computing device 110 may be local to and/or remote from the server computer 100. In non-limiting embodiments, the client computing device 110 presents one or more graphical user interfaces (GUIs) 112 to a user. The GUIs 112 may present one or more document preparation workflows generated by the server computer 100 as a template based on at least the multi-national organization data and the tax rules data. A user may interact with the GUIs 112 to configure the document preparation workflow (e.g., visual workflow) by, for example, assigning one or more roles to one or more nodes and/or actions, modifying a sequence of nodes, adding due dates, adding nodes, removing nodes, specifying a filter (e.g., one or more parameters for retrieving a subset of data from a larger data set), specifying an algorithm, and/or other configuration details that a user may wish to specify and/or adjust. In non-limiting embodiments, a filter may retrieve entities within a geography (e.g., country or region), entities having revenues satisfying a threshold, and/or the like. The GUI 112 may present different fields for each of a plurality of filter parameters.

In non-limiting embodiments, the user may configure the document preparation workflow through various drag-and-drop modules, drop-down menus, buttons, links, checkboxes, input fields, slide bars, and/or other like tools presented on the GUIs 112. The GUIs 112 may also present one or more visual representations of workflow data. As an example, a filter may be processed to determine how many French entities exist for a multi-national organization having 500 or more entities. For a filter to show, for example, all French entities, the input data may be a multi-national organization footprint (e.g., profile based on an entity chart). The output in such an example is a list of French entities. As another example, for a filter to show all of the transactions that French entities are engaged in, the input to the filter is the transaction history for those entities. The output in such example is a list of transactions to which the French entities are parties to. As another example, for a filter to show all tax-abusive transactions the French entities are involved in, the input to the filter is the transaction history for those entities and a tax rules database (e.g., a tax-abusive transaction rules engine or database). The output in such an example is a list of abusive transactions those entities are a party to. As a further example, if the filter to show all tax-abusive transactions the French entities are involved in requires information about one or more transactions with a different entity (e.g., a Japanese entity), a query may be automatically sent to a person corresponding with a specified role (e.g., a controller for the Japanese entity) for additional input for processing the filter. The output in such an example is the response from the person with the specified role, which can be input to an additional filter.

In the context of a workflow, a node with a filter may be configured to identify entities in the footprint that meet certain criteria, such as selecting all entities that qualify as Controlled Foreign Corporations (CFCs) under Argentina tax rules, which means any entity which is not resident in Argentina, which has an Argentinian shareholder, and where the entity earns passive income. In such a case, the data on whether entities are earning passive income from an Argentina tax point of view may come from a questionnaire that asks a series of questions to get to this answer. A similar approach may be used to determine the types of reports to generate after applying the filter. In the above example, once the filter has identified the CFCs for Argentina purposes, a user could populate the CFCs data along with other data on one or more reports which could be templates in Excel, PDF, XML, etc., and the need to generate this could also be based on a questionnaire where the answers provided will determine what reports have to be generated with the filtered data.

In non-limiting embodiments, one or more questionnaires may be presented on a GUI to ask the user a series of questions that are used as conditional logic to trigger how different stages, nodes, and/or actions of the workflow will be triggered. Such questionnaires may be used to set up and/or configure the workflow, and in other examples may be used to customize an existing workflow. A questionnaire may also be communicated and sent to other users automatically based on a role of the user and a role associated with the workflow and/or portion of the workflow. Questionnaires may prompt for confirmation of one or more data elements (e.g., yes or no) or may prompt for a specific answer to be input. Questionnaires may be used during initial configuration of a workflow and/or during execution of a workflow. For example, during configuration, a user may add one or more questionnaires in any of the nodes (e.g., stages) or as a separate node to ask participants one or more questions that are used to process conditional logic (which may be specified by the user or predetermined) to trigger how different nodes of the workflow will be executed. For example, when participants are asked to review the imported entity data, the node for importing entity data may include a questionnaire for the user to respond if, during a certain time period, they were or are aware of any new entities that have been added and, if yes, to provide certain details. Similar questionnaires may be presented for entities that have been sold, liquidated, merged, had a change of ownership, change in entity type, and/or change in entity name, and for any other review stage of the workflow. In non-limiting embodiments, a questionnaire node may be a standalone node in a workflow or may be a part of another node, such as a conditional questionnaire. For example, a review node may have a conditional questionnaire where the first reviewer is asked if they want a second review.

In non-limiting embodiments, during configuration and arrangement of a workflow, a user may schedule the workflow to be repeatedly executed and, when it repeats, the filters may be automatically adjusted for changes in entity data. Further, during repeated execution, additional or fewer documents may be generated, such as additional country reports if entities have been added in any new countries, and a workflow may be automatically created or selected to have these filtered reports reviewed by stakeholders assigned to the new countries. In non-limiting embodiments, a workflow may be configured to automatically execute in response to a change in entity data, rules data, and/or the like. In an example of such a change, the workflow may be automatically altered to account for the change.

Still referring to FIG. 1, after the document preparation workflow is configured by a user through the client computing device 110 and/or another computing device in communication with the server computer 100, the configuration may be stored by the server computer 100 as workflow data and/or configuration data in a configuration database in the data storage device 107 and/or with any other stored data associated with the multi-national organization. The user may schedule repeated execution of the workflow or a portion thereof at predefined intervals and/or specified dates, and/or may choose to execute the workflow once or a set number of times.

With continued reference to FIG. 1, in non-limiting embodiments, the server computer 100 may execute the document preparation workflow by performing one or more actions associated with each node in the sequence of the workflow. In some examples, the server computer 100 performs an action by issuing an instruction to at least one other system that, in response to the instruction, may perform a corresponding action. In some examples, the server computer 100 may determine that information for performing an action is not available and/or is not specified. In such examples, the server computer 100 may automatically generate and communicate a query for the missing information to one or more users through GUIs 114, 116, 118 on other respective computing devices. The users queried may be determined based on roles that are predefined and/or specified by a user during initial configuration. As an example, information about the corporate structure of a subsidiary may be associated with a role at that subsidiary such that one or more persons are associated in a database with that role and at that subsidiary. Such determinations may also consider, for example, a geographic region associated with the action and/or subsidiary entity, and identify one or more persons associated with the specified role in that region. As an example, a role may be a designated contact or agent for a country, and one or more users may be assigned to that role (and thereby assigned to the country). Roles may be stored in relation to users in the entity database of the data storage device 102 or in a separate roles or user database.

In non-limiting embodiments, the server computer may output structured data, a completed form, a report, a graphical chart, and/or the like. In non-limiting embodiments, the server computer 100 may output data to one or more external systems or applications, such as a planning tool, a tax filing tool, a monitoring tool, and/or the like. In non-limiting embodiments, the output data may be in the form of one or more documents, such as a completed tax form (e.g., in PDF or some other format), a partially-completed form, or a file including structured data for receipt by external systems (e.g., JavaScript Object Notation (JSON), Extensible MarkUp Language (XML), and/or the like). In examples in which structured data is output, an external system may use the data to complete a document.

Figure 3:
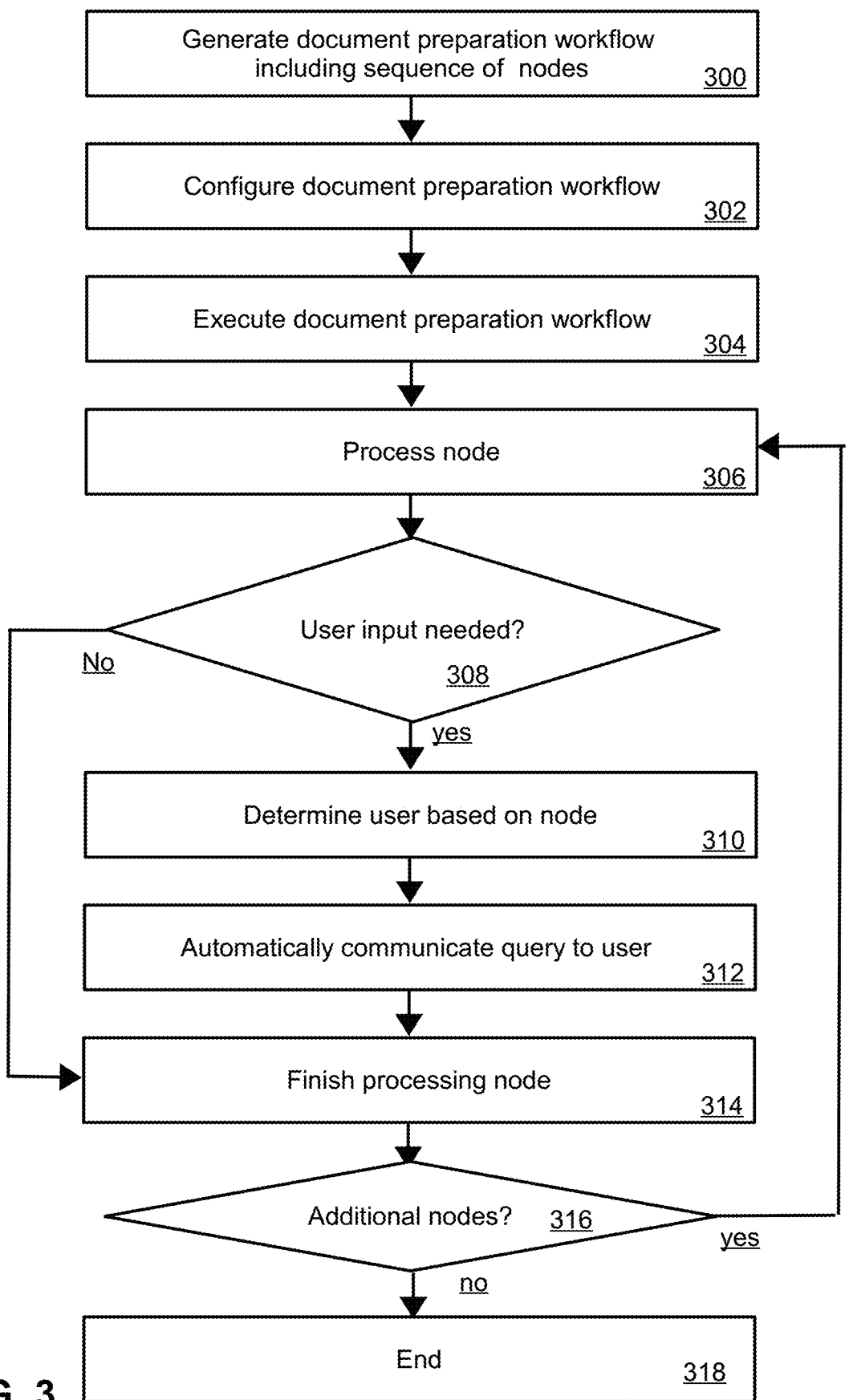
FIG. 3 illustrates a flow chart for a method for automatically preparing documents and/or manipulating and executing a workflow for a multi-national organization according to non-limiting embodiments.

Referring now to FIG. 3, a flow chart is shown for a method of automatic document preparation according to non-limiting embodiments. It will be appreciated that additional steps, fewer steps, different steps, and/or a different order of steps may be used in non-limiting embodiments, and that the flow chart shown in FIG. 3 is shown as an example. At step 300, a document preparation workflow is generated, which includes generating a sequence of nodes. The document preparation workflow may be generated by a server computer as a template based on available data, such as multi-national organization data, tax rules data, and/or the like. The document preparation workflow may be presented to the user on one or more interactive GUIs.

At step 302, a user may interact with the one or more GUIs to configure the document preparation workflow. For example, a user may interact with one or more nodes in a visual workflow to identify a role associated with that node. A user may additionally or alternatively assign roles to specific actions, modify the sequence of nodes (e.g., by dragging and dropping or otherwise selecting a position), add due dates, add nodes, remove nodes, specify a filter (e.g., one or more parameters for retrieving a subset of data from a larger data set), specify an algorithm, and/or other configuration details that a user may wish to specify and/or adjust. For example, a user may assign roles to users such that a first user has a role that is queried for data input for the node and a second user has a role that validates the data. In some examples, a user may configure a node by linking a due date with an action. In some examples, a series of questions and/or prompts may be presented to a user to gather configuration information in a structured manner that may be used to customize and configure the document preparation workflow before, during, or after the visual workflow is displayed for interaction.

Still referring to FIG. 3, at step 304, after the document preparation workflow has been configured, it is executed. The document preparation workflow may be automatically executed upon completion of the configuration, may be automatically executed at a specified time or time interval, and/or may be manually executed by a user. Executing the document preparation workflow includes iterating through each node in sequence and/or according to any conditional logic and executing the action(s) associated with each node. For example, upon execution at step 304, at step 306 the first node in the sequence is processed by analyzing the content of the node (e.g., identifying one or more actions specified by the node). At step 308, as part of processing the node, it is determined whether user input is needed to complete one or more actions associated with the node. If user input is not needed, and the action(s) can be performed independent of user input, the method proceeds to step 314 and the node is fully processed. For example, one or more actions corresponding to the node may be performed at step 314 directly after step 308 if the action can be automatically performed with available data and without needing any additional data.

With continued reference to FIG. 3, if user input is needed at step 308, the method proceeds to step 310 to determine a user based on the node and/or action. For example, a role may be identified that is assigned to the node and/or action and, based on the configuration data, entity data, or other data, a user is identified that corresponds to the role. A user may be identified by name, email, phone number, IP address, and/or the like, such that they can be communicated with. At step 312, a query is automatically communicated to the identified user to obtain one or more inputs. A node may involve queries to multiple users in some examples. After receiving the user input, the method proceeds to step 314 and the processing of the node is completed. If data is obtained from a user at step 312, such data may be used to perform the one or more actions of the node at step 314.

Still referring to FIG. 3, processing the node may include performing one or more automated actions, such as obtaining data from one or more internal or external sources, performing a calculation, validating data, and/or adjusting one or more aspects of the workflow (e.g., adding nodes, removing nodes, modifying nodes, and/or the like). In some examples, processing a node may involve an action of obtaining a response to reviewing one or more aspects of the workflow data, entity data, rule data, or the like, such as displaying one or more portions of a workflow (e.g., viewable as a slide) to a user to receive feedback that alters the sequence of the workflow, modifies one or more aspects of configuration data for the workflow, enables an action to be performed, and/or the like. At step 316, it is determined if additional nodes are in the sequence for continued execution of the workflow. If so, the method proceeds back to step 306 to process the next node in sequence. If not, the method may end at step 318. As explained herein, the end of the method may involve generating one or more documents, transmitting one or more documents, and/or the like.

Figure 4:
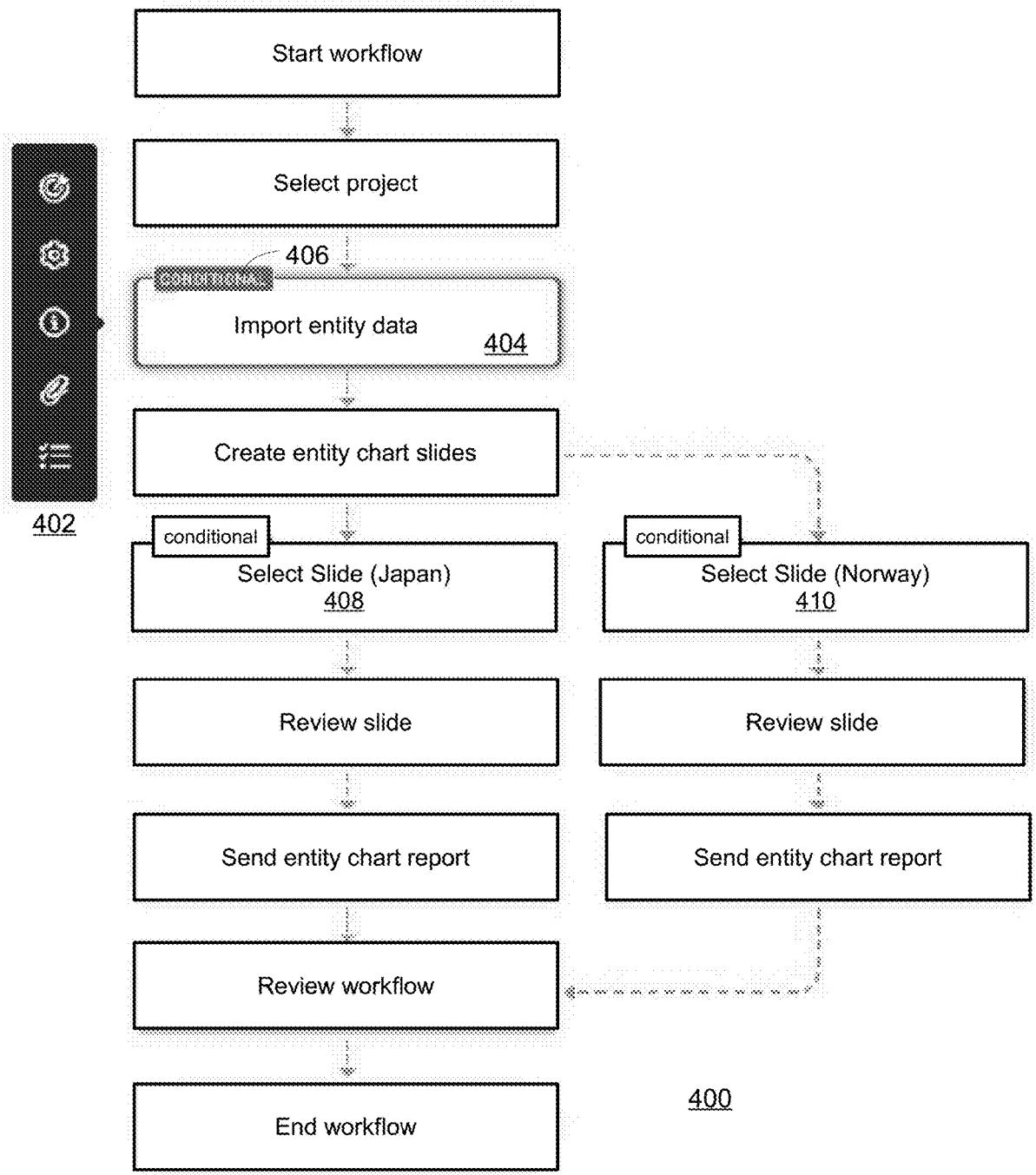
FIG. 4 illustrates a visual workflow GUI according to non-limiting embodiments.

Referring now to FIG. 4, a visual workflow GUI 400 is shown according to non-limiting embodiments. The GUI 400 shown is an interactive GUI in which a user can modify nodes, add nodes, remove nodes, and/or the like using workflow tools 402. The workflow tools 402 may include one or more selectable options to configure a node (e.g., assign roles or the like). The visual workflow GUI 400 may be created anew or may be selected from a plurality of templates. If a template is selected, the visual workflow GUI 400 may facilitate a user to modify the workflow from the template. Nodes may be selected from a library (e.g., an actions or pre-configured node library), and may include actions such as "select project," "import entity data," "export entity data," "create entity chart slides," "select entity chart slides," "send entity chart report," "complete a questionnaire," "review slide," and "review workflow," as examples. It will be appreciated that various other types of actions may be specified, including output options (e.g., generating reports, generating documents, filing documents, sending documents, and/or the like).

A user may select a node from the workflow to edit it. In the example shown in FIG. 4, a user has selected the node "Import Entity Data" 404 and, in response to the selection, the node is highlighted. Further, some nodes may include a tag 406. For example, the nodes 404, 408, 410 shown in FIG. 4 include a "conditional" tag that indicates that one or more actions associated with that node are dependent on an input being obtained from one or more users. For example, a review node, such as node 408, may include a condition that is based on asking whether a reviewer wants a second review (e.g., a yes/no condition). Depending on the answer, the flow of the workflow (e.g., the next node) may be determined.

With continued reference to FIG. 4, some nodes in the visual workflow GUI 400 may represent separate workflows (each including a plurality of actions). As an example, a node may represent a sub-workflow that itself includes a plurality of nodes when expanded. In the example workflow 400 shown, nodes 408, 410 each represent a "slide" (e.g., a sub-workflow) for a particular jurisdiction that is selected via user input.

Figure 5:
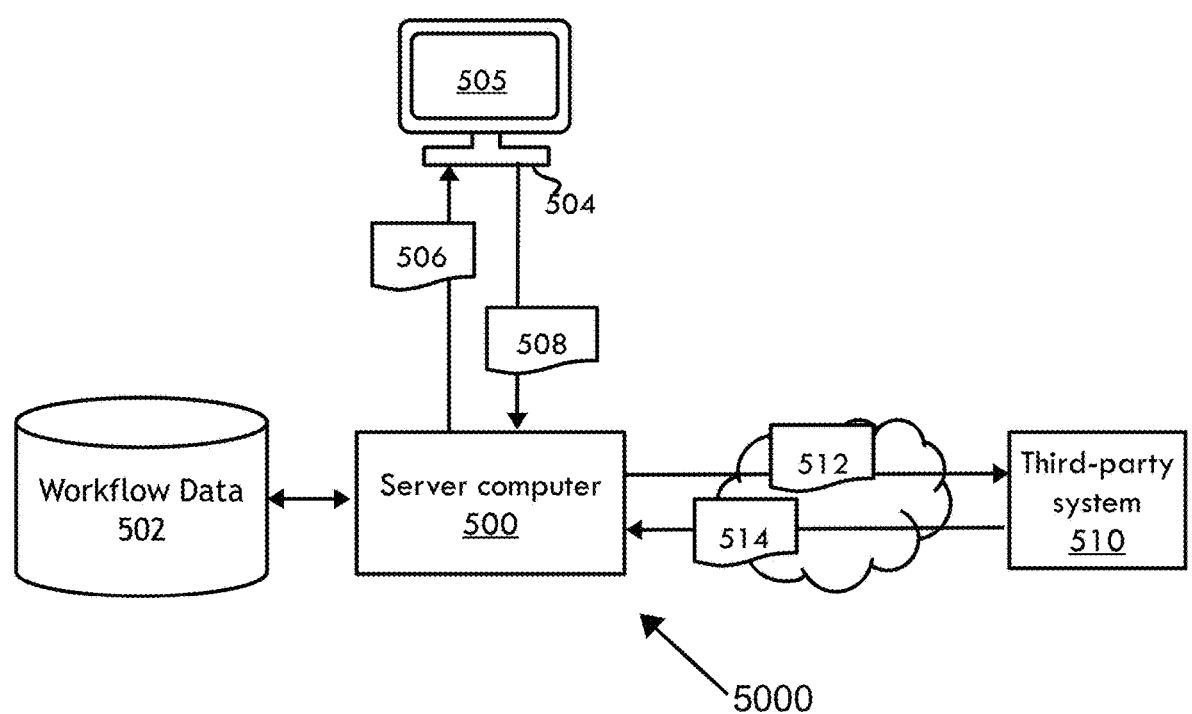
FIG. 5 illustrates a system for automatically preparing documents and/or manipulating and executing a workflow for a multi-national organization according to non-limiting embodiments.

Referring now to FIG. 5, a system 5000 for automatically preparing documents and/or manipulating and executing a workflow for a multi-national organization is shown according to non-limiting embodiments. A server computer 500 is in communication with a data storage device 502 including workflow data, which may include workflow templates, predefined workflows, configuration data for one or more workflows, and the like. The server computer 500 may also be in communication with other databases (not shown in FIG. 5) including entity data, rules data, transaction data, and/or the like. In some examples a user may wish to configure a workflow from the workflow data and/or a selected workflow may require configuration.

In non-limiting embodiments, and with continued reference to FIG. 5, a user of a computing device 504 may configure (e.g., customize) existing workflows by specifying actions and/or rules through a GUI 505. Such user configuration may be based on one or more scripts and/or conditional rules (e.g., if "A" is true, then perform "B") input by a user. Additionally or alternatively, a user may customize existing workflows based on one or more GUIs 505 presented on the computing device 504 designed to obtain information from a user without requiring scripts to be programmed or specific rules to be drafted. For example, a question or questionnaire may be presented to a user to obtain responses that are used to configure a predefined workflow for a particular usage. In some cases, the server computer 500 may send a query 506, which may include one or more questions in a structured data format, to the computing device 504 to prompt a user for one or more inputs 508. In some examples, the computing device 504 may be that of an administrative user and/or may be identified by an administrative user. In some examples, the server computer 500 may target one or more different user computers to obtain data that it needs to configure the workflow. Responses to one or more queries during configuration of the workflow may extend a branch of the workflow to one or more preexisting, additional workflows (e.g., viewable as a slide) to include such additional workflows in the beginning, end, and/or middle of the main workflow.

For example, a workflow (e.g., such as a workflow to transmit tax forms to tax authorities, such as DACE forms or the like) may depend on the reporting country and may therefore prompt a user with the question "What is the reporting country?" In some examples, multiple users may be presented with questions to conduct a data survey that allows for erroneous responses to be recognized. If a user in such an example answers with "Germany," then the workflow may be modified with an additional branch to include a sequence of nodes (e.g., actions) to be executed that correspond to tax reporting in Germany. In some examples, the nodes will still prompt one or more users for input during an execution phase of the workflow, but during configuration such questionnaires and/or prompts may be defined.

With continued reference to FIG. 5, in some instances the server computer 500 may obtain data from one or more third parties, such as a third-party system 510, during a configuration phase to configure a workflow or during an execution phase to complete one or more actions specified by nodes of the workflow. In some examples, the server computer 500 may send a query 512, such as an API request, to the third-party system 510 to cause the third-party system to return one or more response messages 514 including data or an indication that data is unavailable. In some examples, inputs received from the computing device 504 and/or third-party system 510 in response to one or more queries during configuration of the workflow may extend a branch of the workflow to one or more preexisting, additional workflows (e.g., viewable as a slide) to include such additional workflows in the beginning, end, or middle of the main workflow.

Figure 6:
FIG. 6 illustrates an activity tracker GUI according to non-limiting embodiments.

Referring now to FIG. 6, an activity tracker GUI 600 is shown according to non-limiting embodiments. The activity tracker GUI 600 may be presented as a frame, pop-up window, tab, and/or the like, and may be made accessible with one or more selectable options on various other GUIs. In some examples, the activity tracker GUI 600 may be automatically generated to show a summary of activity by all users based on a predetermined default date range. In non-limiting embodiments, the activity tracker GUI 600 may be customized by preconfigured settings and/or settings specified by the user through the activity tracker GUI 600. The activity tracker GUI 600 may include information that associates users with actions, such as editing a project or data from a project, creating a project, deleting a project, and/or the like. Using one or more tools, a user may be facilitated to add custom comments, replies, attachments, links, and/or the like within an activity feed and/or element that would then be visible to other users.

Figure 7:
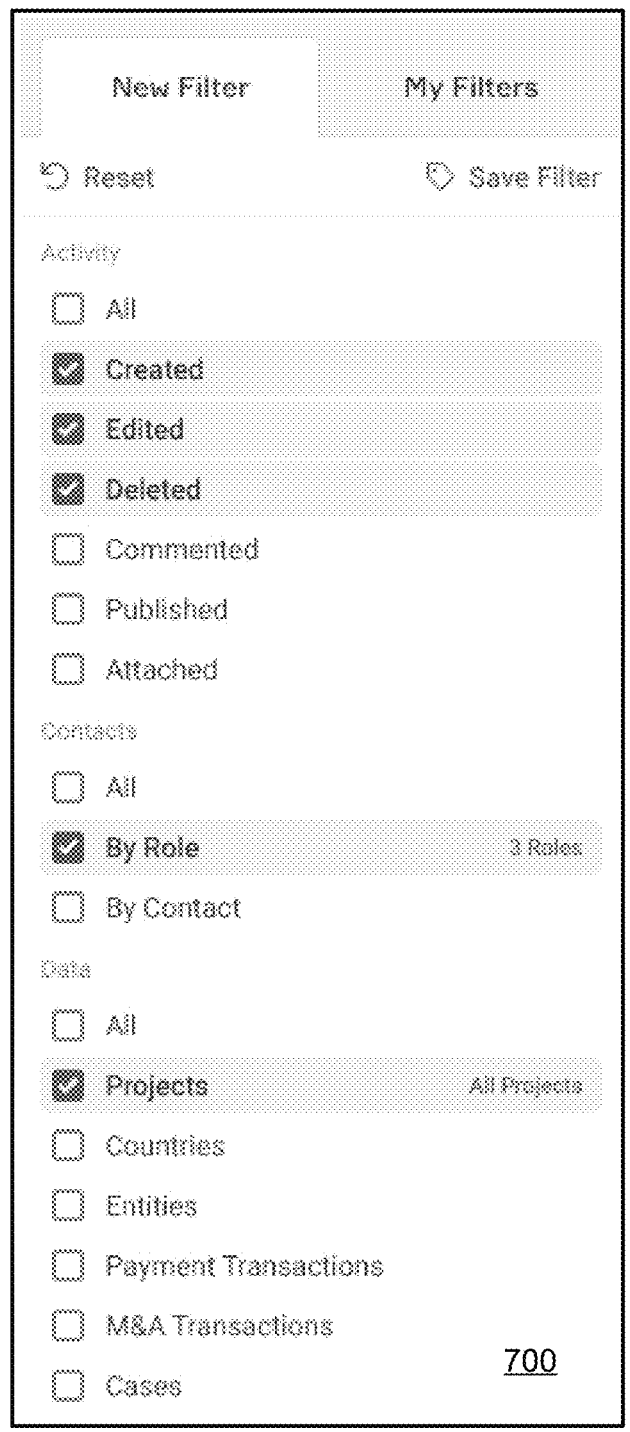
FIG. 7 illustrates a filter GUI according to non-limiting embodiments.

Referring now to FIG. 7, a filter GUI 700 is shown according to non-limiting embodiments. The filter GUI 700 may be presented as a frame, pop-up window, tab, as part of the activity tracker GUI 600 shown in FIG. 6, and/or the like. The filter GUI 700 may include selectable options (e.g., checkboxes, radio buttons, input boxes, drop-down menus, and/or the like) for customizing the information displayed on the activity tracker GUI 600 shown in FIG. 6. Through the filter GUI 700, a user may select from one or more default filters. For example, a user may choose to filter by activity items in which the user's name was mentioned, activity items associated with the user (via mentioning the user's name, the role associated with a node or action, and/or the like), and/or activity items which are associated with the user and in which other users have relied, suggested edits, and/or the like. It will be appreciated that various other filter options may be presented based on role, contact, project, jurisdiction, entity type, transaction type (e.g., payment transactions, merger and acquisition transactions, and/or the like), user, status (e.g., created, edited, commented, published, attachment added, deleted, and/or the like), and/or other like parameters. Through selection of one or more selectable options through the filter GUI 700, a user may create custom activity filters for themselves and/or for other users. In some examples, an administrative user may create activity filters for other end-users.

In non-limiting embodiments, the activity feed (e.g., such as that shown in the activity tracker GUI 600 of FIG. 6) and/or the filter (e.g., such as that shown in the filter GUI 700 of FIG. 7) may be shared among users. For example, a user may share the activity feed itself or a filter to enable another user to reproduce a particular activity feed. An activity feed may be shared with both internal and external users. In some examples, stakeholders (e.g., such as principal users associated with an entity) may be notified at pre-scheduled frequencies and/or based on a trigger such as a specified date, user request, and/or the like. Such stakeholders may be provided access to the system in a manner that permits viewing of an activity feed that may be configured with filters prior to being presented. These viewing users may be presented with a display of activity items and a display of various other screens (e.g., forms, charts, and/or other data) that are presented based on a filter to show information relevant for one or more activities being tracked. In some non-limiting embodiments, filters such as those shown in the filter GUI 700 of FIG. 7 may be used to configure reports, audit trails, and/or the like.

Figure 8:
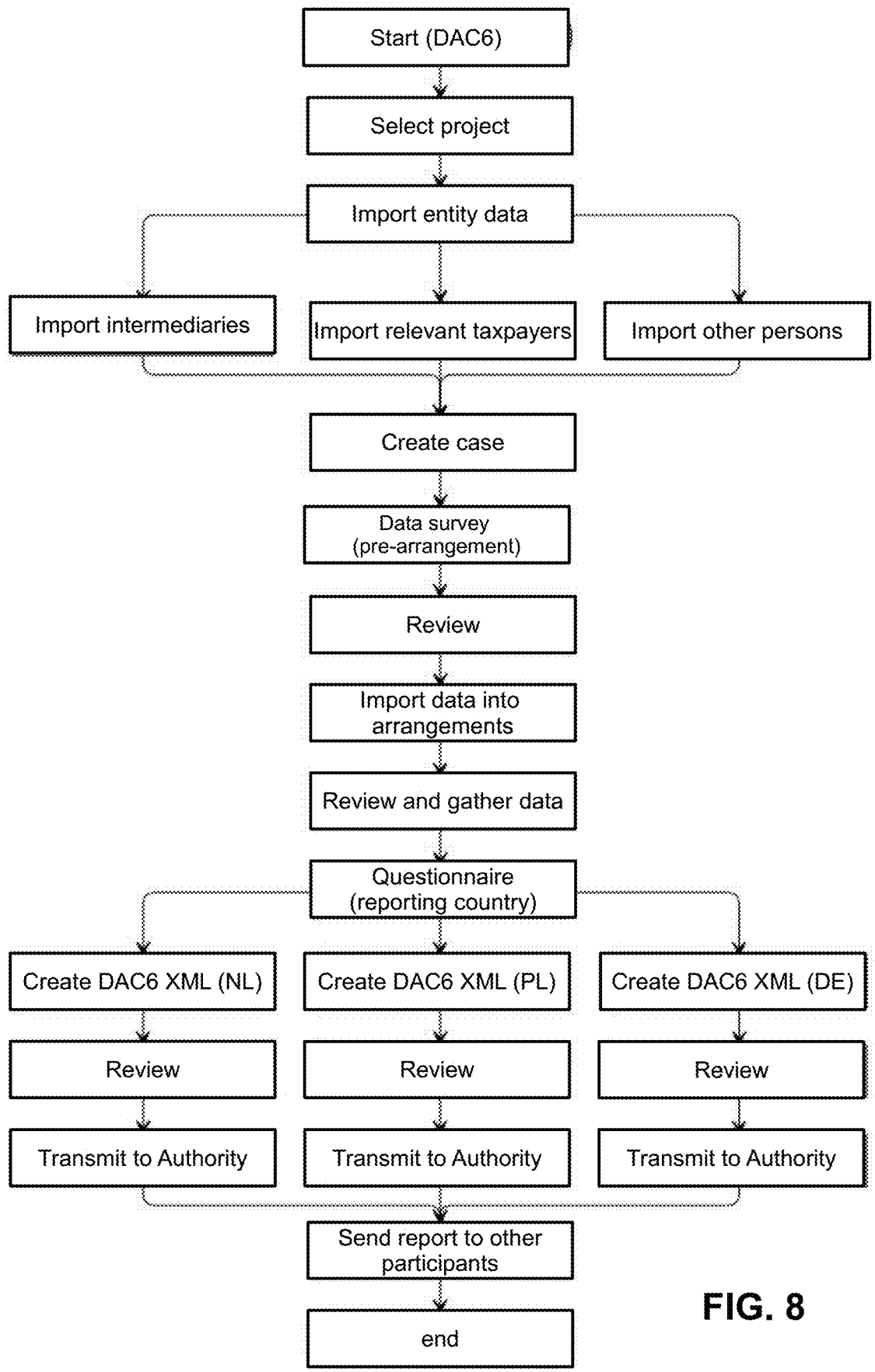
FIG. 8 illustrates an example template workflow for DACE reporting according to non-limiting embodiments.
Figure 9:
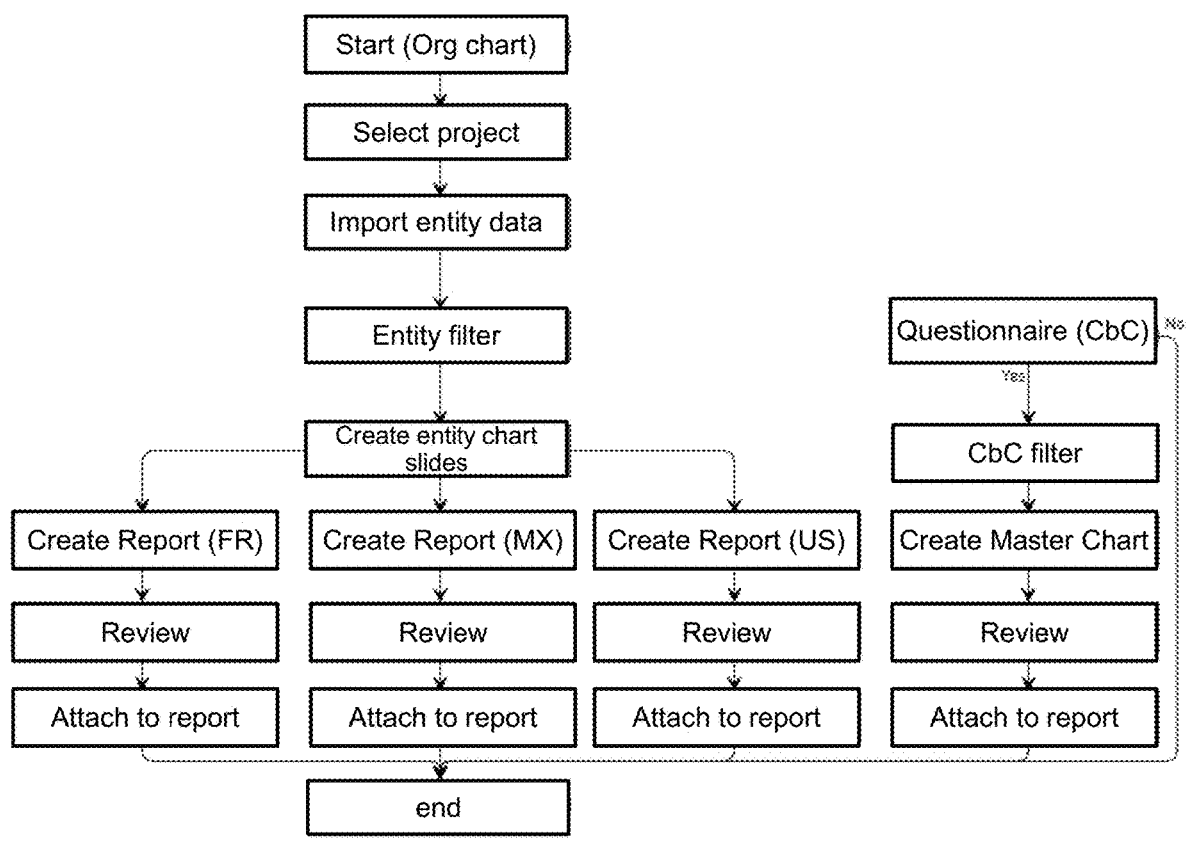
FIG. 9 illustrates an example template workflow for creating multiple views of a legal organization chart according to non-limiting embodiments.
Figure 10:
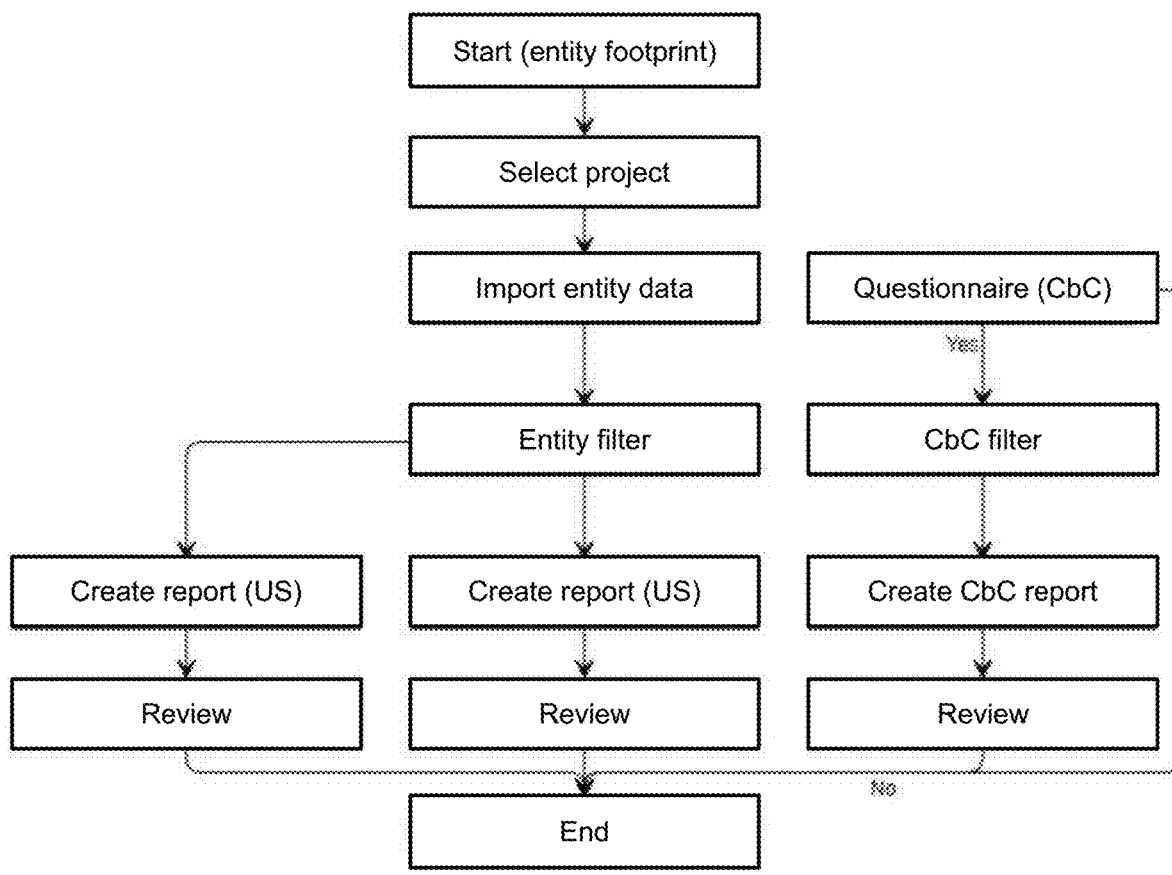
FIG. 10 illustrates an example template workflow for generating an entity footprint according to non-limiting embodiments.

FIGS. 8-10 illustrate example workflows according to non-limiting embodiments. FIG. 8 shows a template workflow that is used to create an end-to-end workflow for DAC6 reporting. The core actions, represented by nodes in the template workflow, include create a project for the current tax year, import entity data into entity data grid, import entity data into the relevant taxpayer grid, create case in a pre-arrangement, complete a data survey workflow, review for a pre-arrangement case, move data into arrangements, review and gather data, using a questionnaire to ask participants "what is the reporting jurisdiction" and based on the answer determine which DAC6 form to populate and which form to automatically transmit, review the document and, when complete and no errors are found, automatically transmit to the relevant tax authority, and send email reports to other participants when confirmation identification numbers are received from the tax authority.

FIG. 9 shows a template workflow that is used to create multiple views of a legal organization chart. The core actions, represented by nodes in the template workflow, include create project for the current tax year, import entity data into an entity data grid, create master chart in an entity designer, create sub charts for each jurisdiction using filters, create a filtered view, notify relevant stakeholders to review sub charts, fix review comments and make a slide available for download in PDF report format, notify the relevant stakeholder to download final report in PDF, create a filtered view of a master chart for US tax compliance including charts for form 8858, CbC Master Chart, notify the relevant stakeholder to review slides, and notify the relevant stakeholder to download final slides.

FIG. 10 shows a template workflow that is used to generate an entity footprint. The core actions, represented by nodes in the template workflow, include create project for current tax year, import entity data into entity data grid, and send link to invite one or more participants to review the imported entity data. Sending a link may be broken down using filters by, for example, country or region, such that the review of different filtered reports may be sent to different participants. In this example, the import entity data node may be executed from several different sources, including via a direct connection to external sources such as Enterprise Resource Planning (ERP) systems and point solutions such as corporate secretarial tools. This workflow may be altered during configuration by a user and/or automatically using conditional logic to create more complex filtered views of the entity data, generate reports, and/or share reports with relevant stakeholders. For example, a user may create a list of all entities that qualify as United States Controlled Foreign Corporations (CFCs) (non-US entities which are owned at least 10% directly or indirectly by US entities) and share it with persons responsible for filing 5471 forms for US tax returns.

Figure 2:
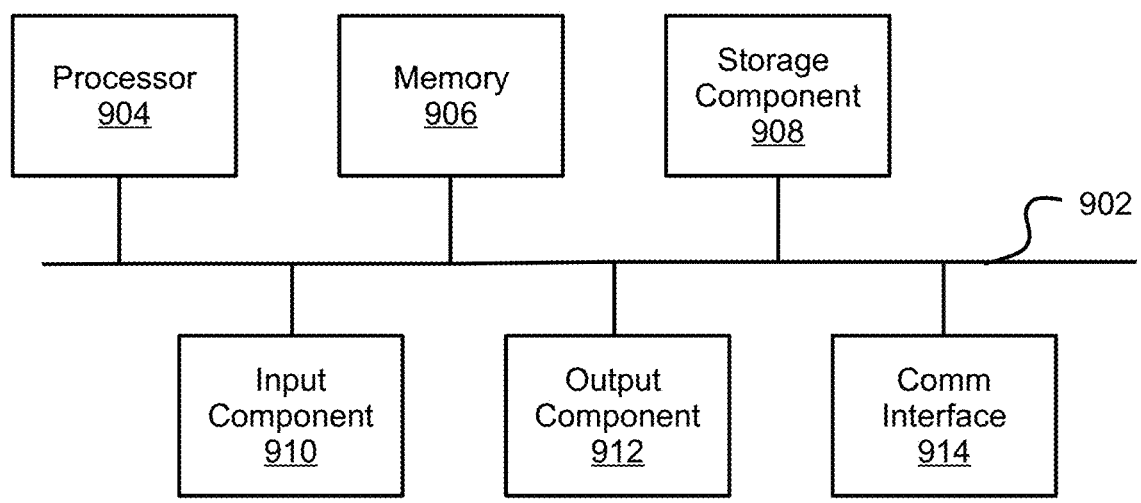
FIG. 2 illustrates example components of a computing device used in connection with non-limiting embodiments.

Referring now to FIG. 2, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 2. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 2, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
generating, with at least one processor, a document preparation workflow based on multi-national organization data for a multi-national organization, the document preparation workflow comprising a sequence of nodes based on multi-national organization data and rules data;
executing, with the at least one processor, the document preparation workflow by automatically performing a plurality of actions associated with the sequence of nodes based on the multi-national organization data and the rules data;
automatically querying, with the at least one processor, a plurality of data sources based on executing a node of the sequence of nodes to obtain data;
modifying, with the at least one processor, the sequence of nodes based on the data received in response to querying the plurality of data sources;
continuing to execute, with the at least one processor, the sequence of nodes after it is modified; and
automatically preparing at least one document based on executing the sequence of nodes.

2. The computer-implemented method of claim 1, further comprising:
displaying, with the at least one processor, at least one graphical user interface configured to facilitate interaction between a user and the document preparation workflow.

3. The computer-implemented method of claim 2, further comprising:
configuring, with the at least one processor, at least one node of the sequence of nodes by associating at least one role with the at least one node based on user interaction with the at least one graphical user interface.

4. The computer-implemented method of claim 2, further comprising:
modifying, with the at least one processor, the sequence of nodes based on user interaction with the at least one graphical user interface.

5. The computer-implemented method of claim 1, wherein automatically querying the plurality of data sources based on executing a node of the sequence of nodes to obtain data comprises:
presenting at least one question to multiple different users.

6. The computer-implemented method of claim 1, wherein modifying the sequence of nodes based on the data received in response to querying the plurality of data sources comprises:
extending a branch of the document preparation workflow to at least one additional workflow to include the additional workflow in the document preparation workflow.

7. The computer-implemented method of claim 1, further comprising:
repeating execution, with the at least one processor, of the document preparation workflow.

8. The computer-implemented method of claim 7, further comprising:
before repeating execution of the document preparation workflow, automatically adjusting, with the at least one processor, at least one filter associated with at least one node of the sequence of nodes, the filter comprising one or more parameters for retrieving a subset of data from a larger data set.

9. The computer-implemented method of claim 1, wherein the document preparation workflow comprises at least one node representing a sub-workflow that expands into a plurality of nodes.

10. The computer-implemented method of claim 1, wherein the document preparation workflow comprises a plurality of sub-workflows, each sub-workflow corresponding to a different jurisdiction.

11. A system for automatic document preparation for a multi-national organization, comprising at least one processor programmed or configured to:
- generate a document preparation workflow based on multi-national organization data for a multi-national organization, the document preparation workflow comprising a sequence of nodes based on multi-national organization data and rules data;
- execute the document preparation workflow by automatically performing a plurality of actions associated with the sequence of nodes based on the multi-national organization data and the rules data;
- automatically query a plurality of data sources based on executing a node of the sequence of nodes to obtain data;
- modify the sequence of nodes based on the data received in response to querying the plurality of data sources;
- continue to execute the sequence of nodes after it is modified; and
- automatically prepare at least one document based on executing the sequence of nodes.

12. The system of claim 11, wherein the at least one processor is further programmed or configured to:
- display at least one graphical user interface configured to facilitate interaction between a user and the document preparation workflow.

13. The system of claim 12, wherein the at least one processor is further programmed or configured to:
- configure, with the at least one processor, at least one node of the sequence of nodes by associating at least one role with the at least one node based on user interaction with the at least one graphical user interface.

14. The system of claim 12, wherein the at least one processor is further programmed or configured to:
- modify the sequence of nodes based on user interaction with the at least one graphical user interface.

15. The system of claim 11, wherein automatically querying the plurality of data sources based on executing a node of the sequence of nodes to obtain data comprises:
- presenting at least one question to multiple different users.

16. The system of claim 11, wherein modifying the sequence of nodes based on the data received in response to querying the plurality of data sources comprises:
- extending a branch of the document preparation workflow to at least one additional workflow to include the additional workflow in the document preparation workflow.

17. The system of claim 11, wherein the at least one processor is further programmed or configured to:
- repeat execution of the document preparation workflow.

18. The system of claim 17, wherein the at least one processor is further programmed or configured to:
- before repeating execution of the document preparation workflow, automatically adjust at least one filter associated with at least one node of the sequence of nodes, the filter comprising one or more parameters for retrieving a subset of data from a larger data set.

19. The system of claim 11, wherein the document preparation workflow comprises at least one node representing a sub-workflow that expands into a plurality of nodes.

20. The system of claim 11, wherein the document preparation workflow comprises a plurality of sub-workflows, each sub-workflow corresponding to a different jurisdiction.

21. A computer program product for automatic document preparation for a multi-national organization, comprising at least one non-transitory computer-readable medium including program instructions that, when executed by a processor of at least one computing device, cause the processor to:
- generate a document preparation workflow based on multi-national organization data for a multi-national organization, the document preparation workflow comprising a sequence of nodes based on multi-national organization data and rules data;
- execute the document preparation workflow by automatically performing a plurality of actions associated with the sequence of nodes based on the multi-national organization data and the rules data;
- automatically query a plurality of data sources based on executing a node of the sequence of nodes to obtain data;
- modify the sequence of nodes based on the data received in response to querying the plurality of data sources;
- continue to execute the sequence of nodes after it is modified; and
- automatically prepare at least one document based on executing the sequence of nodes.

* * * * *